United States Patent

[11] 3,612,377

[72] Inventor Richard W. Pembroke
Tulsa, Okla.

[21] Appl. No. 21,704
[22] Filed Mar. 23, 1970
[45] Patented Oct. 12, 1971
[73] Assignee Midwestern Instruments, Inc.
Tulsa, Okla.

[54] TAPE BRAKING APPARATUS
9 Claims, 4 Drawing Figs.

[52] U.S. Cl. .......... 226/195, 188/65.1, 242/75.2
[51] Int. Cl. .......... B65h 23/10
[50] Field of Search .......... 226/195, 7, 95, 97; 242/75.2, 156; 188/65.1

[56] References Cited

UNITED STATES PATENTS 2,778,634 1/1957 Gams .......... 226/95
3,268,139 8/1966 Edwards .......... 226/195 X

*Primary Examiner*—Richard A. Schacher
*Attorney*—Head and Johnson

ABSTRACT: A brake for stopping a magnetic tape having a first brake block and second brake block providing a tape channel therebetween, the first brake block having apertures therein communicating with the channel and a passageway communicating with the apertures and extending exteriorly of the brake block, the second brake block having a cavity opposite the apertures, a brake pad positioned in the cavity, the brake pad being formed of sintered metal spheres and having porosity permitting air to pass therethrough into and out of the cavity, and means for supplying air pressure to the first brake block passageway whereby air flows through the apertures and against the tape to force the tape into contact with the brake pad.

INVENTOR.
RICHARD W. PEMBROKE
BY
Head & Johnson
ATTORNEYS

INVENTOR.
RICHARD W. PEMBROKE
BY Head & Johnson
ATTORNEYS

TAPE BRAKING APPARATUS

BACKGROUND, SUMMARY AND OBJECTS OF THE INVENTION

This invention relates to a brake apparatus for stopping a magnetic tape and is particularly applicable to digital tape transports. In the computer industry a commonly used method of storing information is on magnetic tape which is passed from one reel to another during the process of placing information on or retrieving information from the tape. In order to efficiently utilize computer facilities magnetic tape must frequently be quickly accelerated, stopped, and again accelerated in the same or opposite direction. Any lag in the time required to stop the tape minimizes the efficiency of computer operations and therefore much effort has been expended to increase the speed of travel of magnetic tape and to shorten the starting and stopping times.

Many problems have been encountered in attempting to provide efficient and effective braking apparatus for magnetic tapes. Among the problems encountered are the following:

a. Inconsistency of the stopping distance or stopping time;

b. Contamination of the braking surface resulting in a change of braking parameters;

c. Inconsistency of braking due to normal wear occurring in the apparatus requiring adjustment to compensate for such wear;

d. Inability to brake tape quickly without stressing the tape, such as occurs in a brake system that applies a high force to a small tape area, such as line contact across the tape which successfully stops the tape rapidly but frequently damages the oxide structure due to the high stress applied to a small area;

e. Inability of the braking systems to stop and hold the tape in steady condition without imposing an excess amount of friction which must be overcome at the succeeding acceleration command;

f. Aerodynamic instability of the tape due to the air boundary layer which develops between the tape and the braking surface;

g. Inability of the braking system to resist contamination from normal machine lubricants and solvents and difficult experience in cleaning the braking system without change in the performance characteristics; and h. Failure of the braking mechanism to maintain a stopped condition for a long period of time without the portion of the tape subject to stopping pressure becoming deformed or undergoing chemical reaction.

It is an object of this invention to provide a braking apparatus for magnetic tape which overcomes the problems, difficulties and limitations such as those set forth above, experienced with existing types of braking systems.

More particularly, it is an object of this invention to provide a braking system for stopping magnetic tape having improved performance characteristics.

Still more particularly, it is an object of this invention to provide an improved braking apparatus for magnetic tapes including means of absorbing the air boundary layer developed between the tape and the braking surface so as to afford improved braking characteristics and reduced braking time.

These general objects as well as more specific objects of the invention will be understood by reference to the following description and claims taken in conjunction with the attached drawings.

DESCRIPTION OF THE VIEWS

DETAILED DESCRIPTION

Figure 1:
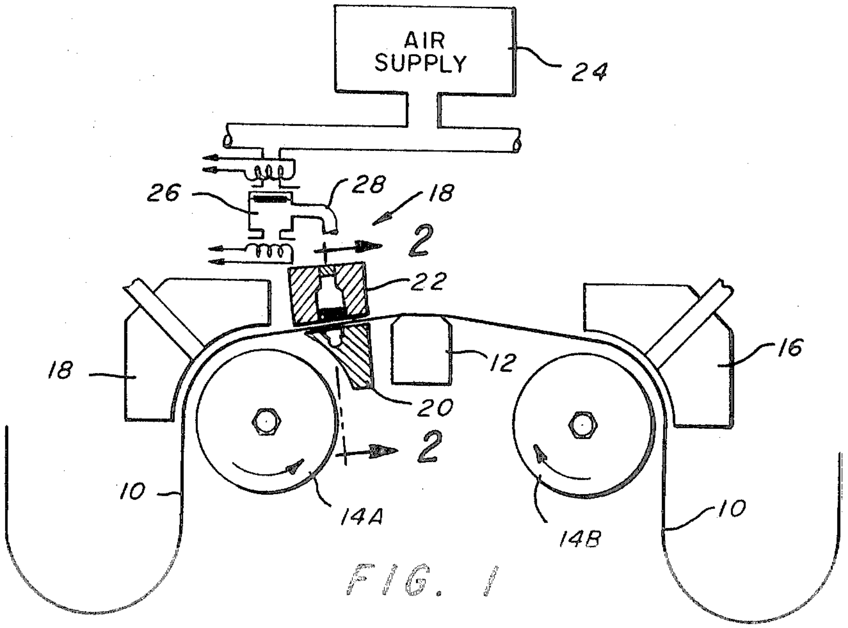
FIG. 1 is a diagrammatic view of a tape transport mechanism including the improved tape braking apparatus of this invention.

Referring now to the drawings and first to FIG. 1 portions of a tape transport mechanism utilizing the brake apparatus of this invention are shown. The purpose of the tape transport is to move on a magnetic tape 10 past a read-write head 12. Tape 10 must frequently move rapidly from a stopped to an accelerated condition, and from a fast moving to stopped condition. In the drive system illustrated in FIG. 1 movement of the tape is accomplished, by way of example, utilizing capstans 14A and 14B which rotate in opposite directions, the direction of the movement of tape 10 depending upon which of the capstans 14A or 14B is contacted by the tape. Air supplied to a forward drive block 16 forces the tape 10 in contact with capstan 14B causing the tape to move in a forward direction. When air pressure is removed from the forward drive block 16 and applied to rearward drive block 18 the tape 10 is forced into contact with capstan 14A and moved in the rearward direction. It is understood that the brake system of this invention is applicable to stop the movement of magnetic tape regardless of the type of drive arrangement utilized to move the tape and the drive arrangement illustrated herein is only for purposes of setting forth a typical environment in which the invention functions.

The brake system of the invention is indicated generally by the numeral 18, and includes a first brake block 20 and a second brake block 22. Air pressure is supplied from a source 24 through a high speed air valve 26 and a conduit 28 to the lower block 22. Such air supply is vented in block 22, in a manner to be described subsequently, against tape 10 forcing the tape into contact with the second brake block 22 to stop the tape. When a start signal is received air valve 22 is actuated to cut off air pressure from conduit 28 and vent it to atmosphere to release the force applied against the tape.

Figure 2:
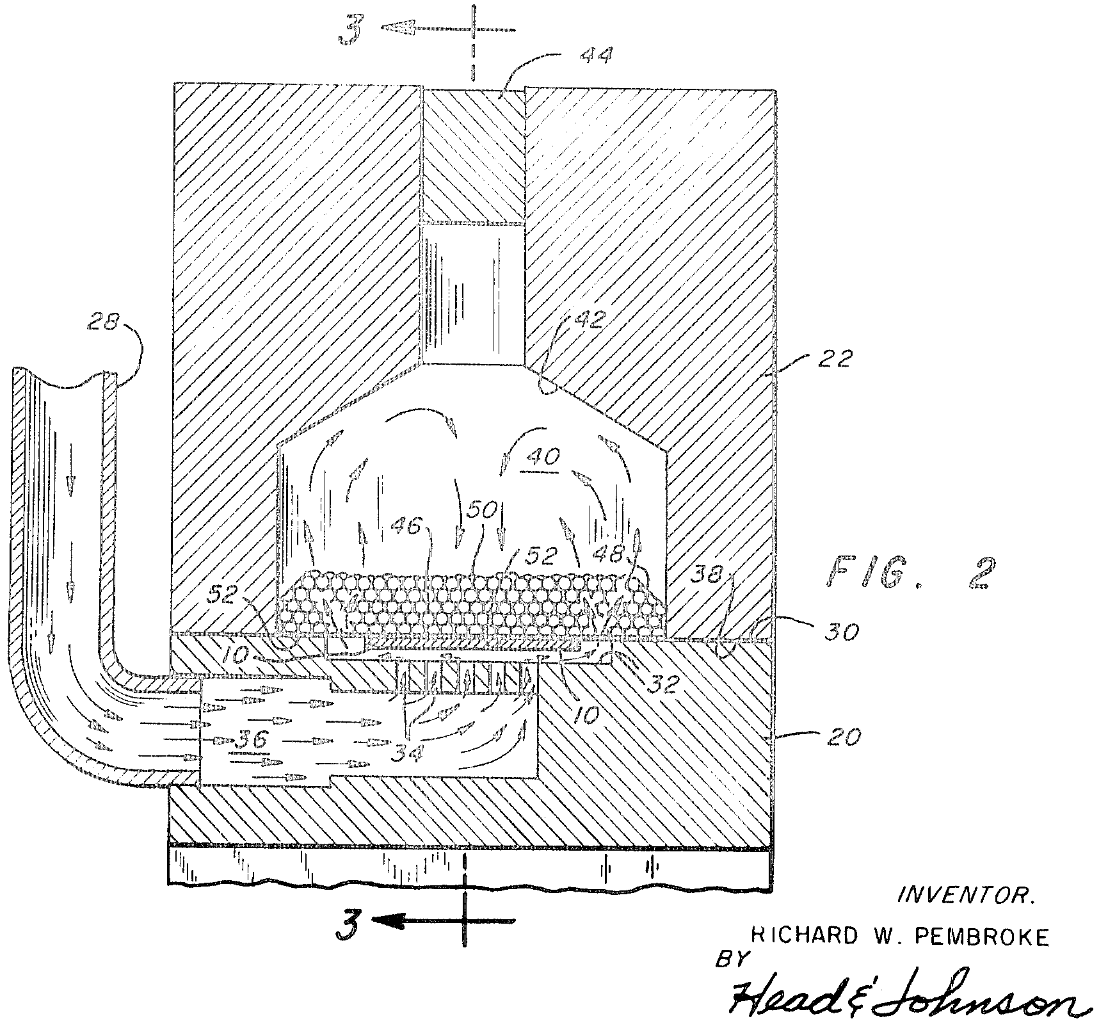
FIG. 2 is an enlarged cross-sectional view taken along the line 2—2 of FIG. 1 showing in greater detail the tape braking apparatus of this invention.
Figures 3, 4:
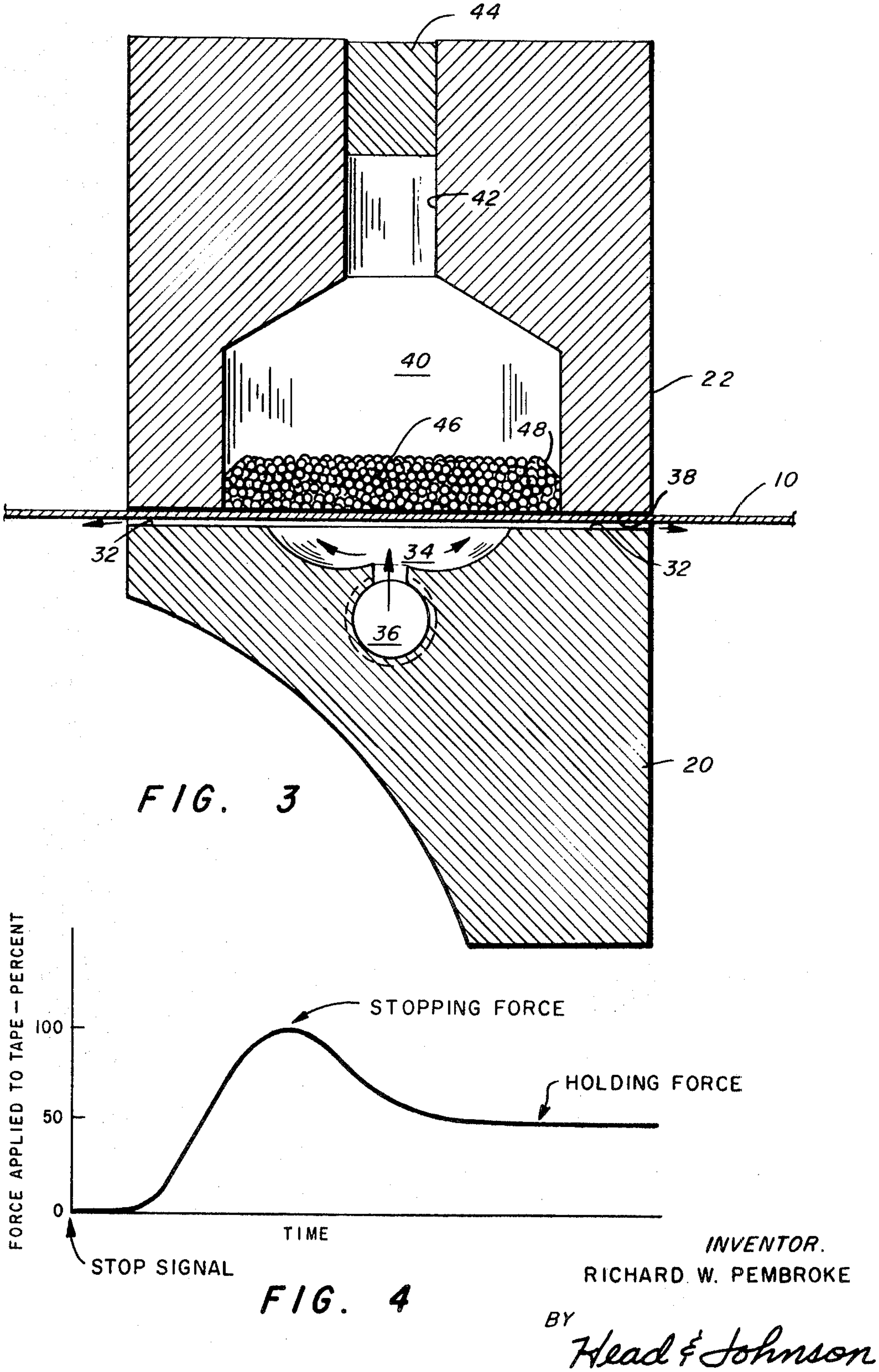
FIG. 3 is a cross-sectional view taken along the line 3—3 of FIG. 2 showing the improved tape braking apparatus of this invention.
FIG. 4 is a graph showing the relative stopping force applied to the tape as the ordinate and time as the abscissa in a typical stopping function utilizing the apparatus of this invention.

Referring to FIGS. 2 and 3, each of which shows a cross-sectional view of the brake blocks 20 and 22 in enlarged detail, the invention can be better understood. The first brake block 20 includes a working surface 30 having a channel 32 therein in which magnetic tape 10 can freely move. Apertures 34 in the working surface 30 communicate channel 32 with a passageway 36. Conduit 28 extends from quick acting air valve 26 to passageway 36 so that air applied through conduit 28 and passageway 36 flows through apertures 34 to engage tape 10. The apertures 34 may be formed of holes but are preferably, as shown, in the form of elongated slots.

Air pressure applied against the tape 10 through apertures 34 force the tape into contact with the second brake block 22 to stop the tape. The brake arrangement described up to this point is not of and within itself new, as others have utilized air pressure to force tape into contact with an object to stop the tape. The essence of this invention is the improved means against which the tape is forced to achieve a superior brake.

The second brake block 20 has a working surface 38 which mates against the working surface 30 of first block 20. Formed in working surface 38 is a cavity 40. While the cavity may be formed in block 22 in a variety of ways one means includes drilling a pilot hole 42 through the block followed by drilling a larger hole from working surface 38 to form cavity 40. Thus the pilot hole 42 is used only as a manufacturing procedure and is not directly concerned with the invention. The hole 42 is sealed with a plug 44 so that cavity 40 is closed except to the working surface 38.

Positioned in cavity 40 is a brake pad 46. While the cross-sectional configuration of cavity 40 may vary, in the preferred and illustrated arrangement it is cylindrical. The brake pad 46, in the shape of a circular flat disc, is press fitted into the cavity 40.

Brake pad 46 is a homogeneous porous element formed of sintered metal spheres, and is preferably formed of sintered small bronze spherical shaped pellets. Brake pad 46 is manufactured by pouring a quantity of spherical pellets, preferably having a diameter of from about 0.01 inch to 0.02 inch, into a steel mold having a recess therein machined to a diameter slightly larger than that desired for the finished pad. The mold and pellets are then fired in an oven to a temperature which is sufficient to cause the surface of the pellets to melt and fuse together, without melting the pellets themselves. After the mold is cooled the brake pad is then in the form of a unitary disc of fused pellets which is clamped in a machine lathe and turned down to a precise outer diameter.

When the brake pad is fused there is a smooth side and rough side, due to the fact that the pellets will align themselves side by side in the bottom of the mold but will merely stack up in the top of the mold. A small chamfer 48 is turned into the edge adjacent the rough side 50 of the pad to facilitate press fitting of the pad into cavity 40. The pad 46 is then placed on a lapping wheel with the smooth side down and lapped to remove a thickness equal to approximately half of the diameter of the spherical pellets of which the pad is formed. As an example, when using pellets of the diameter of 0.017 inch the pad would be lapped down 0.008 inch. This amount of lapping will expose the greatest surface area of the pellets and will not change the porosity of the pad.

Since the pad is formed of small spheres which are merely bonded to each other at their points of contact the pad has a high degree of porosity allowing free flow of air therethrough. The porosity of the pad may vary but in general it should be at least sufficient to permit 1½ cubic feet of air per minute to flow through the pad having a diameter of 1 inch when subjected to air pressure of 2 pounds per square inch. However, the specific porosity is not highly critical to the function of the invention.

After the pad 46 is press fitted into cavity 40 the bottom surface 52 aligns with working surface 38 of block 22 to provide a continuous smooth surface.

Tape channel 32 is of a width providing about 1/64 inch clearance from each edge of the tape and of a depth approximately equal to two times the thickness of the tape. Working surfaces 30 and 38 of blocks 20 and 22 are contiguous to each other except for channel 32 which provides a clearance through which tape travels. In addition, channel 32 provides an avenue through which air can escape for purposes to be described subsequently.

In order to facilitate threading of tape 10 it is desirable that blocks 20 and 22 be movable relative to each other. In a practical embodiment of the invention second block 22 may be formed as a part of a lifter arm which is hinged for pivotation away from first block 20.

Operation

Assume tape 10 is traveling at a speed such as 150 inches per second and a stop command is given. Upon the stop command valve 26 actuates to apply pressure (such as approximately 15 pounds per square inch) to conduit 28. The air pressure is directed into first block 20 through passageway 36 and through apertures 34 into channel 32 and against tape 10. At this time cavity 40 is at atmospheric pressure.

Tape traveling at a high rate of speed carries with it a boundary layer of air which, at the time the stop command is received, is dissipated through the brake pad 46. When air pressure is applied to the lower side of the tape this boundary layer of trapped air between the tape and pad 50 is quickly dissipated by the arrangement of this invention into the porous pad 46 and the tape freely contacts the pad 46, applying braking force.

The porosity of pad 46 is extremely important compared to the function of other known type brake systems in which the tape is applied directly against a braking surface lacking such porosity. Without the porosity in the brake pad 46 of this invention the boundary layer of air carried by the tape must be dissipated before stopping action can take place.

It is important to note that as air continues to pass through apertures 34 it migrates to the edges of tape 10 and through the exposed portion of surface 52 of the pad 46 into cavity 40. As air enters cavity 40 the pressure therein rises from atmospheric to a pressure determined by the parameters of the systems. In the preferred arrangement the parameters are arranged so that the pressure in cavity 40 reaches approximately 50 percent of the pressure applied in passageway 36. The pressure in cavity 40 does not reach that of cavity 46 since air escapes along channel 32 (see FIG. 3) and passes exteriorly of the block.

FIG. 4 shows the relationship of pressure applied to the tape relative to time elapsed after a stop command. When the stop signal is first applied valve 26 functions and pressure begins to build in conduit 28, passageway 36, and in channel 32 beneath tape 10. As this pressure begins to rise force is applied by such air pressure to the tape forcing it into contact with the brake pad 46. The force quickly builds to the maximum stopping force. As air flows around the edge of the tape and through pad 46 into cavity 50 the pressure in cavity 50 builds to approximately 50 percent of the pressure in passageway 36. Thus the pressure differential across the tape reduces to 50 percent of its maximum value and retains this value as long as air pressure is applied to passageway 36.

This feature is exceedingly advantageous in that maximum force is applied to stop the tape whereas a reduced force is utilized to hold the tape in the stopped condition. If the tape is held in a stopped condition for a long period of time the possibility of distortion of the tape is minimized by this automatically reduced holding force.

When a start signal is given air valve 26 actuates to terminate air pressure in conduit 28 and to vent the conduit to atmosphere. Thus the air pressure applied within channel 32 to the lower surface of tape 10 begins to rapidly diminish. When the pressure within channel 32 falls below the pressure of cavity 40 air begins to flow from within cavity 40 through the porous brake pad 46 and into the channel 32, tending to move tape 10 away from the pad surface 52. This means that braking force is quickly relieved since, unlike some other systems wherein the tape is forced against a solid braking surface, it is not necessary for the pressure within the channel 32 to fall to zero in order to relieve all braking force but instead, braking force is completely terminated as soon as the pressure in the channel falls below that within cavity 40. Thus, the effect of cavity 40 is to reduce the time required for completely removing the braking force. Further, a start signal results in air flowing out of cavity 40 which serves to positively move tape 10 away from the braking surface 52 as acceleration begins. While the force exerted by air flowing out of cavity 40 is small and of short duration it is significant in assisting the already reduced holding force to very quickly and reliably release the tape from brake pad 46 and prevent adhesion of the tape to the pad which would otherwise result in slow or erratic acceleration of the tape.

It can be seen that the brake for stopping a magnetic tape of this invention overcomes the problems, disadvantages, and limitations of existing systems mentioned at the beginning of this description.

While the invention has been described with a certain degree of particularity it is manifest that many changes may be made in the details of construction and the arrangement of components without departing from the spirit and scope of this disclosure. It is understood that the invention is not limited to the specific embodiment set forth herein for purposes of exemplification, but is to be limited only by the scope of the attached claim or claims, including the full range of equivalency to which each element thereof is entitled.

What is claimed:

1. A brake for stopping a magnetic tape comprising:

a first brake block and a second brake block each having juxtaposed working surfaces providing a channel therebetween through which a magnetic tape can freely move, the first brake block working surface having apertures therein communicating with said channel and an exteriorly extending passageway communicating with said apertures, said second brake block having a cavity in said working surface thereof opposite said apertures;

a brake pad received in said cavity in said second brake block, said brake pad being formed of sintered metal spheres and having a porosity permitting air to pass therethrough into and out of said cavity; and means of supplying air pressure to said passageway whereby air flows through said apertures forcing magnetic tape into contact with said brake pad.

2. A brake for stopping a magnetic tape according to claim 1 wherein:

said cavity and said brake pad are of a width greater than said tape whereby air pressure applied through said apertures may flow through said brake pad and into said cavity.

3. A brake for stopping a magnetic tape according to claim 1 wherein one of said brake blocks is movable relative to the other to facilitate threading of magnetic tape.

4. A brake for stopping a magnetic tape according to claim 1 in which said cavity is of a cylindrical configuration of a diameter greater than the width of magnetic tape and wherein said brake pad is a circular disc press fitted into said cavity.

5. A brake for stopping a magnetic tape according to claim 1 in which said brake pad is formed of sintered bronze spheres.

6. A brake for stopping a magnetic tape according to claim 5 wherein said brake pad is formed of sintered bronze spheres having a diameter of about 0.01 inch to 0.02 inch.

7. A brake for stopping a magnetic tape according to claim 1 in which said brake pad is a flat member of sintered bronze spheres, the surface of said member engaged by magnetic tape being lapped smooth.

8. A brake for stopping a magnetic tape according to claim 1 in which the porosity of said brake pad is sufficient to permit air to flow through said brake pad at the rate of at least 1.5 cubic feet per minute per square inch when subjected to 2 pounds per square inch air pressure.

9. A brake for stopping a magnetic tape according to claim 1 in which said channel is formed in said first brake block working surface, the width of said channel being slightly greater than the width of magnetic tape to be received therein and of a depth of about two times the thickness of such magnetic tape, said working surfaces of said brake blocks being otherwise contiguous to each other.